United States Patent Office 3,592,953
Patented July 13, 1971

3,592,953
PREPARATION OF HIGH FLOW CELLULOSE DERIVATIVE REVERSE OSMOSIS MEMBRANE
William J. Ward III, Scotia, and Christopher H. Knapp, Schenectady, N.Y., assignors to General Electric Company
No Drawing. Filed Oct. 2, 1967, Ser. No. 672,025
Int. Cl. B29d 7/20, 27/04; C08b 21/04, 29/42
U.S. Cl. 264—49                                                4 Claims

ABSTRACT OF THE DISCLOSURE

An improved method is described for the room temperature preparation of porous membranes of cellulosic derivation as, for example, are employed in reverse osmosis systems. The process provides for a two-step preparation conducted at room temperature and consisting of casting, desolvation of the film and immersion in a room temperature bath after which the membrane is ready for use. Gas phase desolvation with a controlled atmosphere enables (a) the room temperature preparation of such porous films even when highly volatile solvents for the film material are employed and (b) heat treatment of the cast film either during or after immersion is obviated. In spite of the elimination of the heat curing step, the resultant porous membrane can be reproducibly prepared by this improved method to provide salt rejection of divalent ions (calcium and magnesium salts) of greater than about 90 percent at a water flux of at least about 0.7 gal./day-ft.$^2$-atm.$\Delta$P at pressures as low as 40 p.s.i. Tests have established that over a period of at least 12 months, a slight decline was observed in the salt rejection, but the water flux remained substantially undiminished.

---

The instant invention relates to an improved method for preparing a semipermeable membrane adapted to permit substantially selective diffusion therethrough of a solution. More particularly, the instant invention relates to an improved method for the preparation of a porous membrane of modified cellulosic derivation for use in recovering fresh water from a saline solution.

The method of the instant invention which is conducted at room temperature, is an improvement over the methods disclosed in the following U.S. Patents: U.S. 3,133,132—Loeb et al.; U.S. 3,133,137—Loeb et al.; U.S. 3,283,042—Loeb et al., and U.S. 3,310,488—Loeb et al. The disclosure in each of the above-identified patents is incorporated herein by reference.

Considerable research efforts have been expended in applying reverse osmosis to the desalination of various saline waters. From a theoretical standpoint, the reverse osmosis process appears to have the lowest energy requirements of any current desalination process, regardless of plant size. Research efforts have been concerned primarily with the development of membranes characterized by high water flux, effective rejection of dissolved ions, and improved mechanical strength.

In the removal of the water component from a saline solution by the utilization of the reverse osmosis phenomenon, the saline water is forced against a membrane, such as the one produced by the methods described in the above patents and in the instant application, under a hydraulic pressure somewhat greater than the osmotic pressure of the particular salt, or salts, comprising the saline solution. In the case of separating fresh water from sea water the osmotic pressure is approximately 350 p.s.i. because of its particular salt concentration. Saline solutions having lower ion contents have lower osmotic pressures and it is of particular interest to be able to prepare a reverse osmosis membrane having a very high degree of dissolved ion rejection, a relatively long useful life and high water flux under the application of pressures commonly encountered in domestic, commercial and industrial water supply systems. Such a membrane would considerably simplify the softening of water for such systems. In the case of tap water, for example, wherein the concentration of salts (e.g. Ca$^{++}$, Mg$^{++}$) responsible for the "hard" condition of such water is very low (the salt concentration in the drinking water of the City of Schenectady, New York is about 182 p.p.m.) normal house pressure (40–60 p.s.i.) is more than sufficient to overcome the osmotic pressure of such water, which has a value of less than 1 p.s.i.

The complex casting, immersion and heat treating procedure disclosed in the above-referenced patents results in what is essentially a two-layer structure in which a very thin compact upper layer capable of desalination rests on a porous matrix, which acts as a mechanical support therefor. In general, the earlier method involves, first, dissolving in an organic solvent a cellulosic ether or ester derivative having the formula

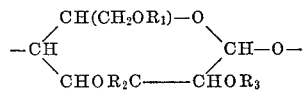

wherein $R_1$, $R_2$ and $R_3$ are members of a group consisting of H, $R_4$ and $CR_5O$ wherein $R_4$ is an alkyl group containing 1 to 8 carbon atoms and $R_5$ is an alkyl group containing 1 to 7 carbon atoms. Also, dissolved in such organic solvent is a pore-producing salt having an anion from the class consisting of iodide, bromide, tetraphenyl boron, salicylate, chlorate, tetraiodomercurate and fluosilicate. In addition, preferably, a different pore-regulating inorganic compound is dissolved in the organic solvent which has an anion from the class consisting of halides and oxygenated halides. Such solution is then cast to form a membrane of substantially uniform thickness and a major portion of the organic solvent is then evaporated over a predetermined period of time. The cast membrane may be then immersed in water and heated, with such immersion and heating being done either in sequence or simultaneously. It should be noted that the terms "porosity" and "permeable" as used in the present application refer only to the fact that the membrane has a structure which allows the selective flow therethrough of an appreciable rate of fresh water under suitable conditions.

Specific examples of the aforementioned cellulosic derivatives are cellulose acetate, cellulose acetate-butyrate, cellulose propionate and ethyl cellulose. Although an aqueous solution of the pore-producing salt is generally preferred, the pore-producing salt may be utilized as a solid without the addition of water. An example of such a salt is a salt having a thicyanate anion, such as potassium thiocyanate. The pore-producing salt is dissolved in an organic solvent which is miscible with water and dissolves the pore-producing salt. Such organic solvent provides a casting solution of desired viscosity so that the solutions are not to viscous to prevent casting of uniform films, but sufficiently viscous to prevent the film produced from becoming jelly-like upon immersion in water. Typical organic solvents which have been found useful in the methods described in the above-mentioned patents are acetone, methyl ethyl ketone, ethyl alcohol, methyl alcohol and mixtures of one or more of such solvent. It should be noted that acetone has been found to give unexpectedly good results with respect to the resulting membrane characteristics. The weight ratio of the organic solvent to cellulosic derivative is normally in the range of about 2/1 to 6/1, with the ratio of about 3/1 being preferred, especially for the combination of the acetone and cellulose acetate. The weight ratio of the aqueous pore-producing salt solution to the cellulosic derivative is about 3/1 to 1/3, with the ratio of about 1/2 being preferred. The concentration of the pore-producing salt in the aqueous solution may range from about 5% by weight to a saturated solution. Thus, in the case of magnesium perchlorate, the weight percent may range from about 5% in the methods employed in the above-mentioned patents.

Various modifications of the above-described method have been described in the literature and reference may be made to articles such as "Studies on Desalination by Reverse Osmosis" by Banks and Sharples (J. Appl. Chem., 16, 94 [1966]) and "Selective Properties of High Flux Cellulose Acetate Membranes Toward Ions Found in Natural Waters" by Erickson, Glater and McCutchan, I & EC Prod. Res. Dev., 3, 205 [1966]), wherein it has been concluded that heat treatment (curing) is an essential feature in the preparation of such membranes. The work of these investigators has apparently indicated to them that the selectivity of these membranes, as well as their over-all desalination properties is related to the curing temperature employed, it being conjectured that curing by the application of heat contributes the mechanism of contracting the pores in the aforementioned very thin desalination layer to a size at which they become the limiting factor in the flow, a size so small that they cease to have any significance as pores and the passage of water through such a heat treated layer becomes permeation by a true solution/diffusion process rather than by pore-flow. In the above-referenced Banks and Sharples article, it was reported that a casting dope containing: cellulose acetate 22.2 g., acetone 66.8 g., water 10.0 g., and magnesium perchlorate (anhydrous) 1.0 g. was used for the preparation of membranes by (a) casting at room temperature (1 minute at about 15° C.), immersion in ice water (0-2° C.) followed by heat treatment at various temperatures, and (b) casting and then immersing at ambient temperatures followed by heat treatment at various temperatures. From these studies, it was indicated that satisfactory reverse osmosis membranes can be prepared by the conduct of both the casting and immersion at ambient temperature, rather than at the low temperatures taught by Loeb et al., if the amount of magnesium perchlorate relative to the other constituents is increased and, if heat treatment is employed to modify the as-cast membranes. Erickson et al. reported on the relative performance of "loose" membranes (membranes cured at relatively low curing temperatures) and "tight" membranes (membranes subjected to relatively high curing temperatures) in the above-mentioned article. The loose membranes were cured at temperatures up to about 65° C., while membranes cured at temperatures above about 65° C. (as for example 75° C.) were categorized as tight membranes. Performance studies by Erickson et al. on reverse osmosis membranes of identical chemical composition exposed to different curing temperatures; ambient (23° C.), 65° C. and 75° C. established that curing at temperatures above 65° C. have a greater effect on performance than curing at lower temperatures and that divalent ions are rejected to a greater extent than the total of all ions in solution by membranes cured at 65° C. From all indications in the data generated and reported by Erickson et al., membranes cast at room temperature and cured at room temperature are ineffective either for the removal of scale-forming ions or for over-all desalination.

Contrary to the teachings of the art, it has been unexpectedly found that the entire membrane preparation (casting, gas phase desolvation and immersion) may be carried out at room temperature (even when film-forming organic solvents, such as acetone, having a high volatility are employed) to produce a membrane of high selectivity, comparatively high water permeability and long life, if the desolvation is conducted under controlled conditions of film-forming solvent partial pressure in the ambient.

Other objects and advantages of the instant invention will be readily apparent from the following description.

In contrast to earlier methods of reverse osmosis membrane preparation wherein either no control is exercised over the gas phase desolvation of the membrane or wherein conditions within the casting solution and newly cast membrane are controlled by temperature reduction, the improvement of the instant invention exercises control over the conditions in the region around the cast membrane to which it is exposed before and during casting-desolvation. Before casting the membrane, which is conducted within a leak-proof compartment, the air in the interior of the compartment is treated to render it in equilibrium with some established solution of the film-casting solvent at room temperature, the film is cast in the closed compartment and permitted to remain in the closed compartment in contact with the deliberately imposed ambient gas phase of predetermined composition for a preselected length of time. The cast film is then immersed in a room temperature bath of a liquid in which the membrane matrix is insoluble. The membrane is allowed to remain undisturbed in the bath for a period of hours, after which this membrane is ready for use without any additional curing at elevated temperatures.

By way of example, a casting solution containing a mixture of cellulose acetate (39.8 percent acetyl), acetone, water and magnesium perchlorate (22.2, 66.7, 10.81, and 1.1 weight percent, respectively) was prepared and a covered container thereof was placed in the casting compartment. All the equipment (casting plate, doctor blade, immersion bath tray, weights, etc.) for conducting the casting and immersion steps were cleaned and placed within the casting compartment. A sealed container of 3% acetone solution (1450 ml. of distilled water and 50 ml. of acetone) was prepared and placed within the casting compartment. The compartment was then closed and air previously passed through a column containing an acetone-distilled water solution (12.5 mole percent acetone) was circulated through the interior of the compartment until the air within the compartment was in equilibrium with the 12.5 mole percent acetone solution. The compartment was then sealed and subsequent operations were conducted from outside the compartment so as not to change the conditions deliberately imposed within the compartment. The film is then cast by passing the doctor blade, or knife, across the glass casting plate in an inclined position with the ends of the knife resting upon side runners controlling the thickness (10 mils) of the as-cast film. Shortly before the immersion step the container of immersion fluid is emptied into the open casting tray. At the expiration of the preselected desolvation time (4.5 minutes) corresponding to the predetermined composition of the gas phase ambient to the newly cast film the plate with its cast film was carefully submerged in the immersion bath. Care was taken to be certain that the film was completely immersed. The membrane was then left undisturbed in the room temperature immersion bath for several hours. At this point, without further treatment or conditioning the membrane was ready for use as a reverse osmosis membrane. Care should be taken to mark the side of the film that is to be oriented in contact with the saline solution.

During the aforementioned desolvation and immersion stages of the instant process structural changes gradually occur and the membrane, which as-cast is 10 mils thick, gradually emerges about 3 mils in thickness. If this membrane is not to be placed into use at completion of the process, it may be stored indefinitely as long as it is not allowed to dry out.

The properties of reverse osmosis membranes fabricated by the instant method are set forth in Table I below:

TABLE I

| Mole percent acetone in aqueous solution with which air in casting box is in equilibrium | Desolvation time, min. | Salt rejection, percent | Water flux, gal.[1] |
| --- | --- | --- | --- |
| 12.5 | 4.5 | [2] 90–94 | 0.7 |
| 15 | 6.0 | [3] 88–92 | 0.8 |

[1] Day-ft.$^2$-atm. $\Delta P$.
[2] Range of performance for six films prepared in identical fashion.
[3] Range of performance for five films prepared in identical fashion.

This same process was conducted using a range of ambients within the casting compartment from a gas phase having a very low acetone content up to one which is in equilibrium with a solution of about 50 mole percent acetone. Also, at each selected gas phase concentration a series of membranes were cast using different desolvation times. It was found that an initial indication of optimum membrane fabrication conditions was provided by observation of the transparency of the resulting films. The operative range was then easily determined from the initial data, which was substantiated by actual test of the membranes. This procedure for producing a desired physical modification of membranes of cellulosic derivation may be duplicated by conduct of the same series of routine tests with other film-casting solvents with the same or other film matrices. In the case of the specific casting solution employed herein those films prepared using any desolvation time and a gas phase ambient in equilibrium with a solution of less than about 12.5 mole percent acetone display too low a water flux. Those membranes prepared using any desolvation time and a gas phase ambient in equilibrium with a solution of greater than about 15 mole percent acetone possess too low a salt rejection to be useful. Having determined the desirable range of gas phase compositions the optimum desolvation time was found to be about 4.5 minutes for the ambient with the lower acetone content and about 6.0 minutes for the atmosphere having the higher acetone content. Subsequent life tests of prepared membranes established the optimum nature of the above-recited ranges of conditions.

The results shown in Table I were obtained for city water (Schenectady, N.Y.) with a 40 p.s.i. pressure applied across the membrane. The salt rejection refers to the rejection of divalent ions (calcium and magnesium salts) which were present in the feed stream at a total concentration of about 182 p.p.m. Life tests conducted on a series of these membranes over a period of more than 12 months have shown that there is some slight decline in the divalent ion rejection but that the water flux remains substantially constant. The high salt rejection, high water flux and long life of such membranes make them particularly adaptable to use as home water softening membranes. These reproducible results are primarily dependent upon the relative simplicity of the casting procedure and the rigid control which is possible over the desolvation portion of the process.

In another series of tests to determine NaCl removal as a function of pressure, membranes prepared by the instant invention displayed substantial (70–90%) rejection of NaCl at pressures in excess of 600 p.s.i.

The reason that rigid control over desolvation is necessary is the fact that the right amount of solvent must be removed at the right rate from the cast film to produce a membrane with useful ion rejection and water throughput properties. Also, at the completion of the desolvation phase, the film must be at the right stage of development, when it is immersed because that particular structural change, which is occuring in the film during the desolvation phase, is stopped as soon as the film is immersed. Thereafter, from the moment of immersion a different structural change occurs conditioned by the fact that water is entering the film and some of the solvent is leaving the film, the water acting as a coagulant and the solvent remaining in the film acting to prevent too rapid coagulation. Neither the rate of desolvation nor the length of the period of desolvation can be adequately controlled, if the difference between the partial pressure of the solvent in the film and the partial pressure of that same solvent in the ambient is too great, because structural changes occur much too fast under such conditions.

Therefore, it is a critical aspect of this invention to provide in the ambient to which the newly cast membrane is exposed a partial pressure of the same solvent as is in the film, the partial pressure of the solvent in this preselected ambient being lower than the partial pressure of the solvent in the film but yet being just high enough to enable close control over the rate at which the solvent leaves the film and enters the ambient.

Experiments were conducted in which the cast film was not subjected to any gas phase desolvation, but was immediately immersed in water and in water-acetone mixtures (up to 70 weight percent acetone). Membranes produced in this manner were opaque and spongy and had a very short useful life although initial performance was very high.

Initially, the attempts at controlled gas phase desolvation using the aforementioned casting solution wherein the air in the casting compartment was saturated with acetone only (by contact with acetone at room temperature) did not work. It was necessary to reduce the acetone content in the compartment ambient and this was accomplished by the use of acetone-water solutions with which this air was equilibrated. The water entered the controlled desolvation atmosphere as water vapor, of course, acting as an inert diluent. Other inert gases could have been used just as well, as for example nitrogen. Similarly, a reduced acetone vapor pressure in the ambient may be attained by circulating through the casting compartment a flow of air previously passed through cold acetone.

The reproducibility of the instant improved process has been demonstrated by showing the reproducibility of reverse osmosis properties (salt rejection and product flux) for a number of membranes prepared by the improved process. Control over the desolvatioin gas phase used for these membranes during their preparation has provided a physical parameter for extremely fine process control over the morphology of the membrane during critical phases of its development. As the result of this discovery another tool is now available to optimize the reverse osmosis properties of membranes of cellulosic derivation.

Elimination of the need for heat curing of such membranes is a complete reversal of the earlier understandings of workers in this empirical area of technology who had firmly concluded that heat treatment at some elevated temperature (greater than 65° C.) was absolutely necessary in order to produce the necessary structure.

It should be understood that the foregoing disclosure has illustrated a mechanism for control over the structural development of membranes of cellulosic derivation, however, the application of this physical control to the casting and desolvation of reverse osmosis membranes made of other matrix material is contemplated.

What we claim as new and desire to secure by Letters Patent of the United States is:

1. In a method for preparing a porous membrane adapted to separate solids from solutions wherein (a) cellulose acetate and a pore-producing salt are dissolved in acetone to form a casting solution, (b) the solution is cast to form a very thin cast membrane from which a portion of the acetone is evaporated for a period of time during which initial changes occur in the structure of the developing membrane, (c) the cast membrane so developed is immersed in water to remove the remaining pore-producing salt therefrom and impregnate the cast membrane with water and (d) the cast membrane is then subjected to a curing phase under the application of heat, the improvement in the above process of conducting at least step (b), the solvent evaporation step, in an enclosed gaseous atmosphere containing a partial pressure of acetone in equilibrium with an acetone solution containing about 12.5 to about 15.0 mole percent acetone and carrying out the entire process at the ambient temperature.

2. The improvement as recited in claim 1 wherein each of steps (a) and (b) are conducted in the enclosed atmosphere.

3. The improvement as recited in claim 1 wherein the casting solution is a mixture (percent of weight) of 22.2% cellulose acetate (39.8% acetyl), 66.7% acetone, 10.81% water and 1.1% magnesium perchlorate and the solvent evaporation is conducted for a period in the range of from about 4.5 to about 6.0 minutes.

4. The improvement recited in claim 1 wherein the entire process is conducted in the enclosed atmosphere.

References Cited

UNITED STATES PATENTS

| | | | |
|---|---|---|---|
| 3,432,585 | 3/1969 | Watson et al. | 264—49 |
| 3,344,214 | 9/1967 | Manjikian et al. | 264—217X |
| 3,439,074 | 4/1969 | Sharples et al. | 210—500X |

OTHER REFERENCES

Erickson, David L., Julius Glator, and Joseph W. McCutchan, "Selective Properties of High Flux Cellulose Acetate Membranes Toward Ions Found in Natural Waters," in I & Ec Product Research and Development, vol. 5, No. 3, September 1966, pp. 205–211.

Banks, W., and A. Sharples, "Studies on Desalination by Reverse Osmosis II, The Relation Between the Fabrication Procedure and the Structure of Cellulose Acetate Desalination Membranes," in J. Appl. Chem., March 1966, vol. 16, pp. 94–99.

PHILIP E. ANDERSON, Primary Examiner

U.S. Cl. X.R.

106—196; 210—500; 264—79, 331, 340